Oct. 29, 1935.  J. R. CAUTLEY  2,018,913
WHEEL
Filed Sept. 11, 1931

INVENTOR.
JOHN R. CAUTLEY
BY
ATTORNEY

Patented Oct. 29, 1935

2,018,913

UNITED STATES PATENT OFFICE 2,018,913

WHEEL

John R. Cautley, South Bend, Ind., assignor to Bendix Brake Company, South Bend, Ind., a corporation of Illinois Application September 11, 1931, Serial No. 562,248

3 Claims. (Cl. 78—54)

This invention relates in general to wheels and in particular to the connection between the rim and body portions of a double disk wheel suitable for heavier-than-air aircraft.

The invention is particularly directed to the structure of the rivet employed to secure the rim and hub to the disk body member in that type of wheel forming the subject matter of United States Patent No. 1,659,365, dated February 14, 1928. Experience has taught that the conventional countersunk type of rivet employed to secure the rim and disk parts together is quite ineffective due to the unusually severe stresses to which these parts are subjected. Such rivets are prone to fracture resulting in the separation of the rim and supporting disks.

Accordingly, the principal object of the invention is to provide a rivet so designed as to withstand the weaving, shearing, side thrust and other stresses to which this type of wheel is subjected.

In one embodiment of the invention there is suggested a countersunk type of rivet for connecting the nested flanges of the disk and rim of the aforementioned Patent No. 1,659,365, the inclined head of the rivet being so fashioned and so positioned with respect to the plane of contact of the aforementioned flanges as to obviate the fracture of the rivets.

A further object of the invention is to provide a rivet connection between the hub and disk body portions of a wheel of aluminum alloy, the several rivets, preferably of steel, being so fashioned in the assembly of the parts as to obviate distortion of the hub flange.

Other objects of the invention and desirable details of construction will become apparent from the following detailed description of a preferred embodiment of the invention taken in conjunction with the accompanying drawing, in which.

Figures 2, 3:
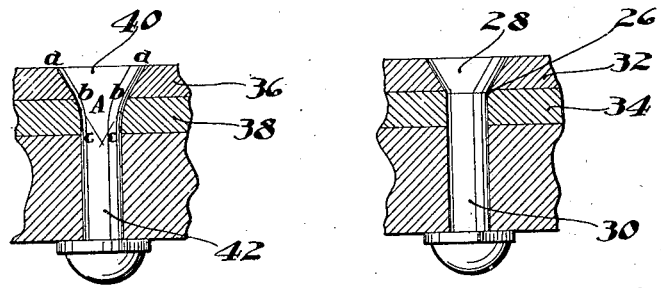
Figure 2 is an enlarged sectional view taken on line 2—2 of Figure 1 and disclosing the structure of the rivet connection in detail.

Figure 3 discloses a conventional type of countersunk rivet connecting the rim and disk parts of Figure 2.

Figure 1:
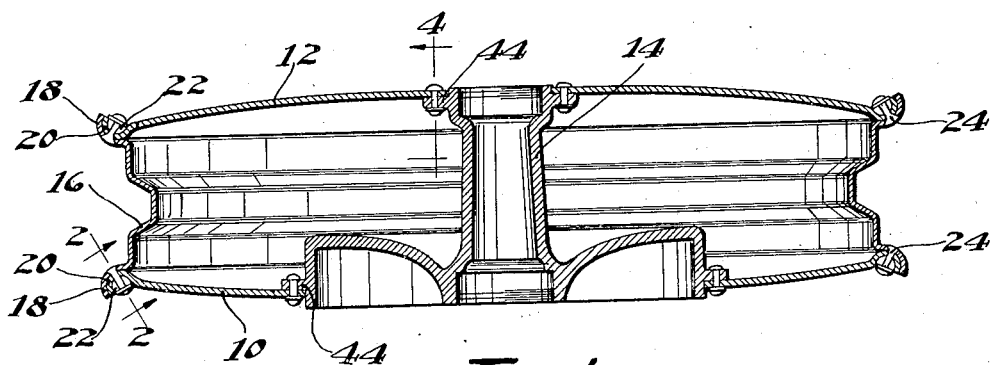
Figure 1 is a vertical sectional view of a disk wheel embodying the rivet structure of the present invention.

In that embodiment of the invention disclosed in detail in Figure 1 there is provided a double disk wheel very similar to that disclosed in Patent No. 1,659,365, the instant invention being an improvement of the structure disclosed in said patent. Such a wheel is particularly useful for airplanes and is accordingly preferably constructed of a light metal alloy, preferably dural. The wheel comprises disk body members 10 and 12 connected at their inner peripheries with a hub member 14 and at their outer peripheries with a drop center rim 16 to complete the wheel assembly. As disclosed in Figure 1, which is similar to the structure of Patent No. 1,659,365, the rim is provided with outwardly rolled tire bead flanges 18, the complementary flanges 20 of the disk body members and reenforcing rings 22 being secured to the tire flanges 18 by countersunk rivets 24. The securing rivets of the patented structure, which are of conventional structure, are disclosed in detail in Figure 3 wherein the junction 26 of the conical head 28 of the rivet and the shank or body portion 30 lies in or immediately adjacent the plane of contact between the rim and disk body flanges 32 and 34. With such a structure, however, the rivets are inclined to shear off at the junction 26, resulting in the separation of rim and disk and ultimate collapse of the wheel. The junction seems to provide a focal point for rupture and this characteristic seems to be accentuated in the relatively light dural rivet usually employed in airplane wheel construction. It should be borne in mind that the wheel parts are subjected to an unusual amount of stress, particularly in the landing and taxying of the plane.

In order to obviate this undesirable effect there is suggested the rivet connection of Figure 2. In this structure both the disk and rim flanges 36 and 38 are recessed to receive the head 40 of the rivet.

That portion of the head extending between $a$ and $b$ constitutes a frustum of a cone and prolongation of the lines $a$ and $b$ preferably forms an angle A of approximately 90°. That portion of the head between $b$ and $c$, the latter point being at the end of the shank portion 42, is preferably curved to provide a fillet portion. It will be particularly noted that this fillet portion extends into the thickness of the disk flange, and that the entire contour of the head is so smoothly flaring as to reduce to a minimum the possibility of fracture. With such a structure there is no so-called fatigue point at which the rivet is liable to rupture. In the improved structure of Figure 2 all stresses, within the elastic limit of the material, will have no appreciable effect upon the rivet, whereas with that type of rivet disclosed in Figure 3, even within the elastic limit, the rivet has a tendency to crystallize and rupture.

It will be understood that while the illustrated embodiments of the invention are described as shown, a considerable latitude is to be permitted in construction within the range of the appended claims.

I claim:

1. In a wheel construction having sheet metal disc side members secured at their peripheries to each side of a channel sectioned sheet metal rim member by a plurality of riveted joints, the combination, in each of said riveted joints, of overlapped portions of said rim member and side members having a bell mouthed aperture therethrough, a rivet seated therein having a correspondingly shaped head portion and a cylindrical portion, said head portion assimilating a frustrum of a hyperboloid, said cylindrical portion flowing into and smoothly connecting with said head portion, and said head portion being of such shape and so arranged in said aperture that the plane of shear between said overlapped portions passes through a section of the hyperboloid head portion of said rivet that is of considerably greater cross section than the minimum cross section of the said head portion.

2. In a riveted joint, a pair of lapped members having a bell mouthed aperture therethrough, a rivet seated therein having a correspondingly shaped head portion and a cylindrical portion, said head portion assimilating a frustrum of a hyperboloid, said cylindrical portion flowing into and smoothly connecting with said head portion, and said head portion being of such shape and so arranged in said aperture that the plane of shear between said lapped members passes through a section of the hyperboloid head portion of said rivet that is of considerably greater cross section than the minimum cross section of the said head portion.

3. In a riveted joint, a pair of lapped sheet members and a reinforcing member, a cylindrical aperture through all of said members, having a bell mouth extending into said sheet members, a rivet seated in said aperture having a head portion shaped to correspond with said bell mouth and a cylindrical portion, said head portion assimilating a frustrum of a hyperboloid, said cylindrical portion flowing into and smoothly connecting with said head portion, said head portion being of such shape and so arranged in said aperture that the plane of shear between said lapped members passes through a section of the hyperboloid head portion of said rivet that is of considerably greater cross section than the minimum cross section of the head portion.

JOHN R. CAUTLEY.